May 23, 1972    J. F. SHERRILL    3,664,636
FLUID PRESSURE VEHICLE JACK
Filed Jan. 11, 1971    2 Sheets-Sheet 2
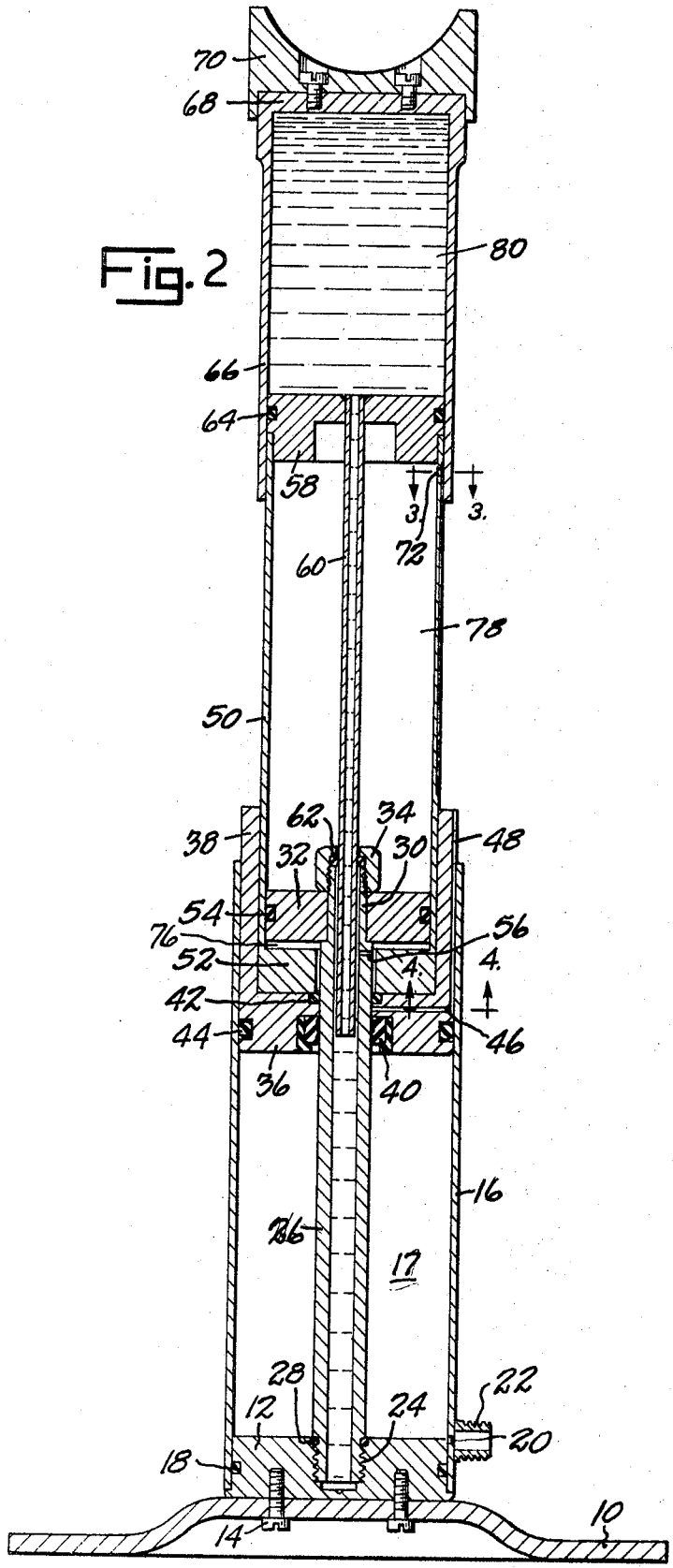
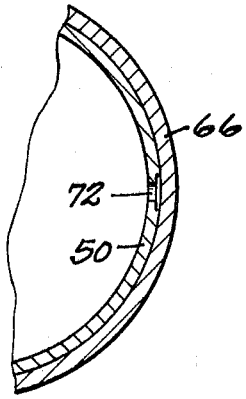
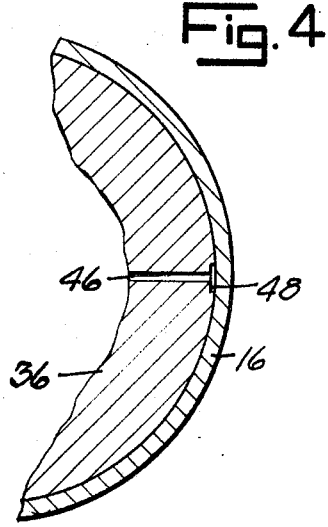
INVENTOR.
JOHN F. SHERRILL
BY *Ottich & Knoblock*
ATTORNEYS

United States Patent Office 3,664,636
Patented May 23, 1972

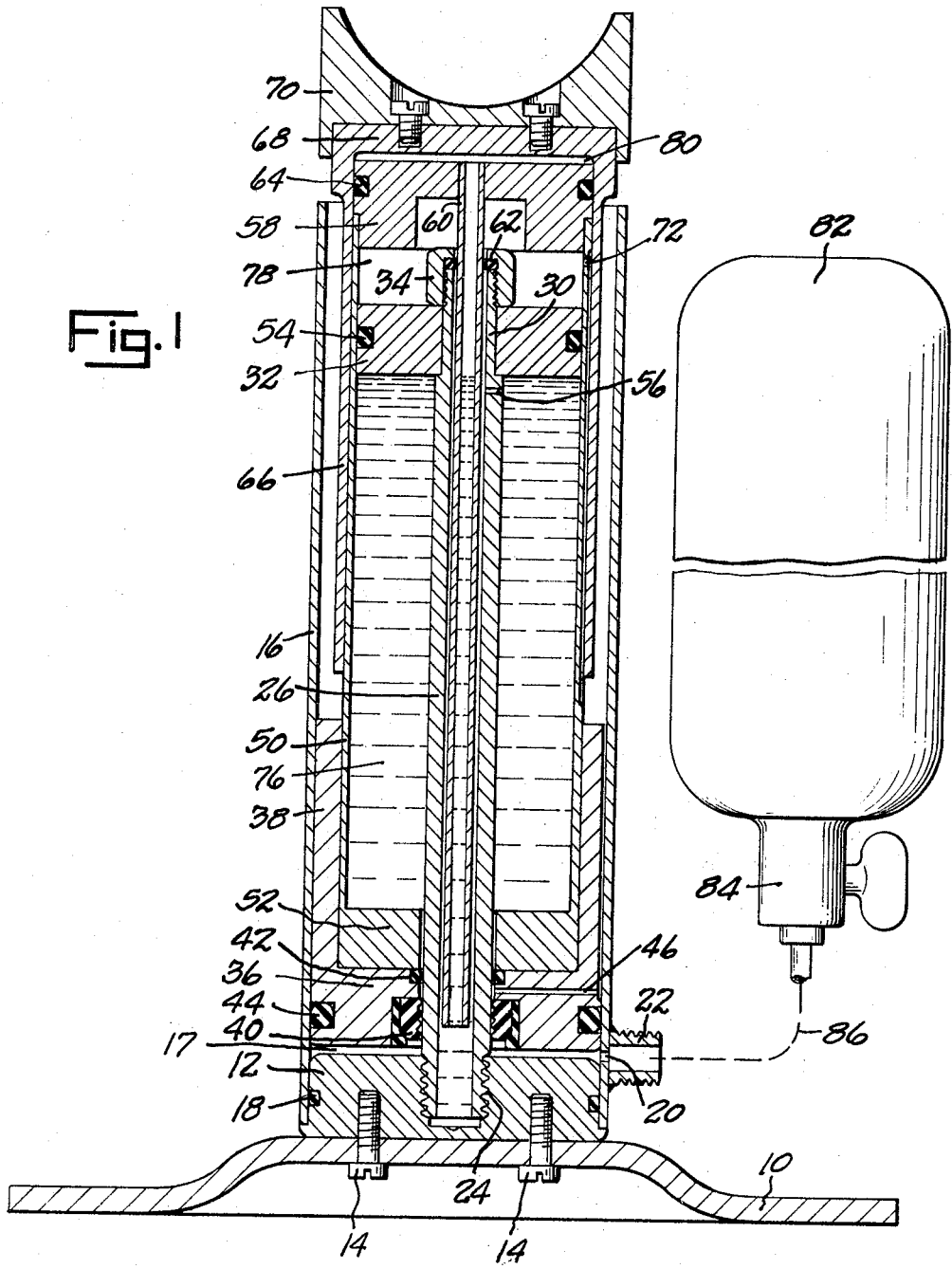

3,664,636
FLUID PRESSURE VEHICLE JACK
John F. Sherrill, P.O. Box L, Plymouth, Ind. 46563
Filed Jan. 11, 1971, Ser. No. 105,458
Int. Cl. B66f 3/24
U.S. Cl. 254—93 HP
8 Claims

ABSTRACT OF THE DISCLOSURE

A fluid pressure vehicle jack comprising three telescoping cylinders and a piston fixed to one cylinder and located within a second cylinder. Said cylinders and piston are arranged to define four chambers. One of said chambers is connected to a supply of gas under pressure. Two other chambers contain liquid and are arranged to communicate and to permit expansion of one thereof while the other contracts. The fourth chamber is vented to atmosphere. Supply of gas under pressure causes simultaneous extension of each of the cylinders.

---

This invention relates to improvements in fluid pressure vehicle jacks.

Vehicle jacks, particularly automobile jacks, have many limitations. They usually require great exertion by the user, and are hazardous in use. Vehicle jacks, such as bumper jacks, are usually large, and are difficult to store because of their size, and their use requires substantial exertion. Hydraulic jacks which are of a size to be handled readily are also characterized by a requirement for substantial exertion by the user to manually pump the same, and are further characterized by a limited extension from collapsed storage condition to elevated use position.

It is the primary object of this invention to provide a fluid pressure jack which overcomes many of the limitations and problems entailed in the use of prior vehicle jacks.

A further object is to provide a fluid pressure lifting jack having a large range or ratio of extension from collapsed to extended or elevated position.

A further object is to provide a device of this character which is small and compact when retracted and thus facilitates storage thereof.

A further object is to provide a vehicle jack which requires minimum exertion by the user to position it and to operate it to elevate a part of a vehicle.

A further object is to provide a vehicle jack which can be powered by a source of gas under pressure.

A further object is to provide a vehicle jack which operates in response to gas pressure and to hydraulic character.

A further object is to provide a device of this character formed of three tubular sections so inter-related as to respond to fluid pressure in a manner to shift relative to each other simultaneously and at approximately the same rate while the jack is being extended.

A further object is to provide a fluid pressure jack having a plurality of chambers, including an expansible chamber adapted to be connected to a gas pressure source and a pair of liquid chambers respectively expanding and contracting for liquid transfer therebetween in a manner to greatly extend the jack in response to expansion of the gas pressure chamber.

Other objects will be apparent from the following specification:

In the drawings:

FIG. 1 is a vertical sectional view of one embodiment of the invention showing the jack in collapsed or retracted position.

FIG. 2 is a vertical sectional view illustrating the jack in extended or elevated position.

FIG. 3 is an enlarged fragmentary detail sectional view taken on line 3—3 of FIG. 2.

FIG. 4 is an enlarged fragmentary detail sectional view taken on line 4—4 of FIG. 2.

Referring to the drawings which illustrate the preferred embodiment of the invention, the numeral 10 designates a base plate or support to the center of which is secured a disk 12, as by means of securing screws 14. One end of a first tube or cylinder 16 encircles disk 12 and is secured thereto in any suitable manner, as by a force fit, brazing or screw threads. An annular seal 18, such as an O-ring, encircles the disk 12 and ensures against leakage of fluid under pressure between the disk 12 and the tube 16. An inlet opening 20 is formed in the tube 16 adjacent the level of the top of disk 12, and an inlet fitting 22, preferably screw threaded, is brazed, welded or otherwise secured to the tube 16 surrounding the inlet opening 20.

Disk 12 has a tapped bore 24 formed at the center of its upper portion with its axis concentric with the axes of disk 12 and tube 16. A small diameter tube 26 has its lower end screw threaded in the bore 24 and extends vertically with its axis concentric with the axis of tube 16. An annular seal 28, such as an O-ring, is preferably seated in an annular recess in disk 12 and encircles small diameter tube 26 to provide a leak-proof and pressure-tight seal preventing leakage between the interior of the small diameter tube 26 and the chamber 17 of tube 16. The upper end of small diameter tube 26 is preferably reduced at 30 to form a shoulder upon which seats a piston 32 which is fixedly anchored upon the tube 26 by an annular retaining nut 34. Piston 32 is of smaller diameter than the bore of tube 16 and is positioned at selected elevation above the disk 12 and preferably adjacent to and slightly below the level of the upper end of tube 16.

A cup-shaped piston member having an end wall 36 and a tubular wall 38 has a snug, sliding fit within tube 16. End wall 36 has a central opening therein providing a snug, sliding fit thereof upon the small diameter tube 26. At its lower surface the end wall 38 is recessed and mounts an annular resilient seal 40 in sealing engagement with tube 26. The upper surface of piston end wall 36 is also recessed and receives an annular resilient seal 42 in sealing engagement with tube 26. The outer surface of the piston 36 preferably adjacent the lower end thereof is provided with a circumferential groove in which is seated an annular resilient seal 44. End wall 36 of the piston is provided with a vent passage 46 extending from the bore thereof between the seals 40 and 42 to the outer circumference thereof. The piston skirt 38 may be provided with a venting passage 48 extending upwardly from and communicating with the vent passage 46. It will be understood, however, that if sufficient clearance to permit fluid flow from passage 46 to atmosphere occurs between piston skirt 38 and the bore of tube 16 upwardly from the passage 46 a separate passage 48 will not be required.

A second tubular member or cylinder 50 has its lower end mounted within and secured to the skirt 38 of the piston 36–38. The lower end of tube 50 is spanned by end wall 52 having a central bore providing a snug, sliding fit upon the small tube 26. Tubular member 50–52 is secured to the cup-shaped piston 36–38 in any suitable manner, as by a press fit, by welding or the like. The inner diameter of tube 50 is such as to receive piston 32 therein with a snug, sliding fit. Piston 32 is provided with a circumferential groove mounting an annular resilient seal 54. Small diameter tube 26 has a radial bore 56 therein located slightly below the piston 32.

The upper end of tube 50 mounts an end wall 58. End wall 58 has a central opening therethrough within which is fixedly secured the upper end of a small diameter open ended tube 60 which extends centrally through the cylinder 50 and through the opening in the annular retainer nut 34 and fits slidably within the bore of the tube 26. Retainer nut 34 is provided with a circumferential internal recess to receive an annular resilient seal 62 encircling tube 60 and located between the nut 34 and the upper reduced end of small diameter tube 26. The upper end wall 58 of tube 50 is fixedly secured to the tube 50 by any suitable means, as by a press fit therein. End wall 58 has a circumferential external groove which mounts an annular resilient seal 64.

A third tube or cylinder 66 has a snug, sliding fit around the second cylinder 50 and the upper end wall 58 thereof and is spanned at its upper end by end wall 68. End wall 68 may mount any suitable work-engaging member 70 shaped to engage a part of a vehicle, such as an axle, a frame member or a bumper. The second tube or cylinder 50 has a passage 72 therethrough at its upper end located immediately below its upper end wall 58. Passage 72 constitutes an air vent communicating with the atmosphere, either through clearance between the bore of cylinder 66 and the outer surface of cylinder 50 or through a longitudinal groove in the outer surface of tube 50 below the bent bore 72.

In the collapsed or retracted position of the jack, as illustrated in FIG. 1, the parts are compactly arranged and the overall height of the unit exceeds only slightly the height of the tube 16. In this position, the lower end wall 36 is located adjacent to the disk 12 so that the chamber 17 is reduced to a very small volume. The chamber 76 within cylinder 50 and located below the piston 32 is of large volume and is substantially filled with a body of oil or other liquid. The upper chamber 78 within the upper portion of cylinder 50 and above the piston 32 is of comparatively small volume and is open to atmosphere. The chamber 80 within cylinder 66 is located above the upper wall of piston 58 of the cylinder 50 and is of small volume. When in this retracted position the jack is easily stored in a small space and is easily handled to position it in the location of its intended use.

The jack is connected at the inlet fitting 22 to a source of gas under pressure when it is to be used. One preferred source of gas under pressure is a container 82 having a valved outlet 84 connected by a line or conduit 86 of selected length to the inlet fitting 22 of the jack. Container 82 is preferably of the type charged with liquid carbon dioxide, although it may be charged with any other gas under high pressure. Also, it will be understood that other gas charging means, such as a compressor or the like, may be connected to the inlet fitting 22 to provide gas under pressure adequate to operate the jack.

When the jack has been positioned at desired location and is connected to a source of gas under pressure, such as a carbon dioxide container 82, a charge of gas under pressure may be introduced through the fitting 22 into chamber 17, as by operating the valve 84. As gas under pressure is introduced into chamber 17, it moves the piston 36–38 upwardly to increase the volume of chamber 17, and reduce the volume of chamber 76. Reduction of the volume of chamber 76 causes liquid to flow through bore 56 into tube 26 and thence upwardly through the bore of tube 60 to enter the upper chamber 80. The upward movement of piston 36–38, which carries with it the second cylinder 50, acts to increase the volume of the chamber 78 above piston 32.

It will thus be seen that the supply of gas under pressure to chamber 70 causes bodily upward movement of the second or intermediate cylinder 50 relative to the lower cylinder of tube 16, and that simultaneously there is also caused the upward movement of the third or upper cylinder 66 relative to the second or intermediate cylinder 50. Stated differently, as the lower charged gas chamber 17 expands to elevate the second cylinder 50, liquid within the second cylinder 50 at the contracting chamber 76 below the piston 32 is displaced through the small diameter tubes 26 and 60 into the chamber 80 within the third cylinder 66. This action also expands the chamber 78 located within cylinder 50 above the piston 32, and such expansion is accommodated by the entry of atmospheric air into chamber 78 through the vent means 72. Thus, the operation of the jack is characterized by a multiplication of the vertical component of movement caused directly by the entry of gas under pressure into chamber 17 to act upon the piston 36.

In one embodiment of the invention in which the piston 36 moves approximately seven inches in the tube 16 and the stroke of cylinder 50 relative to the piston 36 is approximately seven inches and the stroke of cylinder 66 relative to piston 58 is about five and one-half inches, the work-engaging member 70 can be elevated approximately 15 inches from its fully collapsed position. A unit of this character having an inner diameter of tube 16 of approximately two and one-eighth inches, an inner diameter of cylinder 50 of approximately one and five-eights inches, and an inner diameter of cylinder 60 of approximately one and seven-eights inches, when charged with liquid carbon dioxide, will fully extend the jack for approximately 15 inches in response to the discharge of about one cubic inch of liquid carbon dioxide into chamber 17. In this unit, supply of gas at approximately 500 p.s.i. into chamber 17 developed a lift of the unit of approximately 2,375 lbs. Increase in the diameter of the parts will increase the lifting force of the unit. Thus, a unit in which tube 16 has an inner diameter of three inches, when subjected to a charge of gas at 500 p.s.i., will produce a lift of approximately 4,000 lbs.

Where a readily portable liquid carbon dioxide container 82 is employed, the charge thereof may be sufficient to provide five or six operations of the jack under load before the container must be replaced.

It will be understood that the valve 84 of the gas-charged container 82 must be of the type which provides a vent of line 86 to atmosphere when in its closed position. Thus, by adjusting the valve 84 to a venting position while the jack is extended, as shown in FIG. 2, gas can be discharged from chamber 17 and the jack retracts to the FIG. 1 position under the weight of the vehicle. During this action, as the charge of gas in chamber 17 reduces to permit the piston 36 to lower under the applied weight and thereby to increase the volume of chamber 76, liquid is permitted to flow from chamber 80 through tubes 60 and 26 and passage 56 into the chamber 76. As the chamber 76 increases in volume, the volume of the chamber 78 reduces and air therein is discharged or vented through the vent means 72–74.

In view of the high pressures of gas and liquid which are entailed in the operation of the device, the functioning of the seals 40 and 42 to separate the gas from the liquid incident to movement of the piston 36 upon the tube 26 is important to ensure that liquid will not enter chamber 17 by leakage around the tube 26. Such leakage is undesirable because it will result in reduction of the overall stroke or lifting range of the device. Similarly, it is important to prevent escape of gas from chamber 17 into chamber 76, since the gas would aerate the liquid and reduce the operating efficiency of the device. The provision of the vent passage 46 located above the seals 40 and 44 in the piston 36 and below the seal 42 provides a means to vent liquid which may pass the seal 42 and to vent gas which may pass the seal 40. The provision of this vent ensures long service of the jack at its maximum efficiency and lifting capacity.

While the preferred embodiment of the invention has been illustrated and described, it will be understood that changes in the construction thereof may be made within the scope of the appended claims without departing from the spirit of the invention.

What I claim is:

1. A fluid pressure actuated extensible member comprising three telescopically interfitting axially relatively shiftable cylinders, each end cylinder being closed at its outermost end, the intermediate cylinder being closed at both ends, a piston fixedly carried by one end cylinder and located within said intermediate cylinder to define two chambers in said intermediate cylinder, means for connecting one end cylinder to a source of gas under pressure, the chamber of said intermediate cylinder adjacent said gas charged cylinder containing liquid, and means venting to atmosphere the other chamber of said intermediate cylinder, and means defining a fluid passage between said liquid chamber and the end cylinder opposite said gas charged cylinder.

2. A fluid pressure actuated extensible member as defined in claim 1, wherein a hollow longitudinal tube carried by said gas charged cylinder mounts said piston, said tube being closed at its outer end and open at its piston-mounting end, one end of said intermediate cylinder having a sealed sliding fit upon said tube, the other end of said intermediate cylinder carrying an open ended tube fitting telescopically in said first tube, and an annular seal between said tubes adjacent said piston, said first tube having an opening communicating with said liquid chamber.

3. A fluid pressure charged extensible member as defined in claim 2, wherein the seal between said first tube and said intermediate cylinder comprises two axially spaced annular resilient seal members, and an atmospheric vent terminating between said annular sealing members.

4. A fluid pressure vehicle jack comprising a lower cylinder closed at its lower end and open at its top, means for introducing gas under pressure into the lower part of said lower cylinder, a rigid longitudinal tube carried by the lower end of said cylinder and open at its upper end, a piston fixedly mounted on said tube adjacent the upper end of said lower cylinder, an intermediate cylinder having a sealed sliding fit in said lower cylinder, apertured end closures on said intermediate cylinder, seal means carried by the lowermost apertured end closure and engaging said tube, said piston having a sealed sliding fit in said intermediate cylinder to define a lower liquid chamber and an upper vented chamber, an open ended second tube carried by the upper closure of said intermediate cylinder and having a sliding telescopic sealed fit in said first tube, said first tube having an opening therein communicating with said liquid chamber, and an upper cylinder closed at its upper end and having a telescopic sealed fit around the upper portion of said intermediate cylinder.

5. A fluid pressure vehicle jack as defined in claim 4, wherein the lower end of said intermediate chamber is enlarged and the upper portion thereof fits with clearance in said lower cylinder to receive said upper cylinder in said lower cylinder when said jack is retracted.

6. A fluid pressure vehicle jack as defined in claim 5, wherein the upper part of said first tube is of reduced cross sectional size to define a shoulder on which said piston seats, and a piston-retaining cap is screw threaded on said reduced tube portion, and an annular resilient seal is confined by said cap in sealing engagement with said interfitting tubes.

7. A fluid pressure vehicle jack as defined in claim 4, wherein the seal between said lowermost apertured end closure and said first named tube comprises two axially spaced sealing rings, and the aperture of said lowermost end closure is vented to atmosphere between said sealing rings.

8. A fluid pressure vehicle jack as defined in claim 4, and said gas introducing means comprises a container charged with gas at high pressure, a valve controlling discharge of gas from the outlet of said container and venting of said outlet, and a conduit connecting said valved container outlet and said lower cylinder.

References Cited
UNITED STATES PATENTS

| | | | |
|---|---|---|---|
| 3,173,659 | 3/1965 | Hemmeter | 254—93 HP |
| 3,182,959 | 5/1965 | Hemmeter | 254—93 HP |
| 3,399,603 | 9/1968 | Cagle | 92—52 X |

ROBERT C. RIORDON, Primary Examiner

D. R. MELTON, Assistant Examiner

U.S. Cl. X.R.

92—53